(12) United States Patent
Ito

(10) Patent No.: US 6,334,424 B1
(45) Date of Patent: Jan. 1, 2002

(54) CONTROL DEVICE AND CONTROL METHOD FOR VEHICLE

(75) Inventor: Yasushi Ito, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/512,642

(22) Filed: Feb. 24, 2000

(30) Foreign Application Priority Data

Mar. 5, 1999 (JP) ............................................ 11-057985
Mar. 9, 1999 (JP) ............................................ 11-062092

(51) Int. Cl.$^7$ .......................... F02B 17/00; B60K 41/12
(52) U.S. Cl. ............................ 123/295; 701/54; 701/70
(58) Field of Search ............................... 123/295–305; 701/51, 54, 70

(56) References Cited

U.S. PATENT DOCUMENTS

| 5,894,827 A | * | 4/1999 | Kamura et al. ............. 123/305 |
| 6,063,003 A | * | 5/2000 | Kubota et al. ............... 477/43 |
| 6,237,561 B1 | * | 5/2001 | Takahashi .................. 123/295 |
| 6,240,354 B1 | * | 5/2001 | Yamada et al. ......... 123/436 X |

FOREIGN PATENT DOCUMENTS

| JP | 07293649 A | 11/1995 |
| JP | 08177997 A | 7/1996 |
| JP | 11005460 A | 1/1999 |

* cited by examiner

Primary Examiner—Tony M. Argenbright
(74) Attorney, Agent, or Firm—Oblon, Spivak, McClelland, Maier & Neustadt, P.C.

(57) ABSTRACT

During high-load running of a vehicle, first control is performed wherein fuel injection is carried out in an intake stroke of an engine so as to evenly distribute mixture gas into combustion chambers of the engine. During low-load running of the vehicle, second control is performed wherein fuel injection is carried out in a compression stroke of the engine so as to bias mixture gas toward a zone in the vicinity of an ignition plug of the engine. The first control and the second control are switched over from one to the other in accordance with a loaded condition of the engine. Even if the engine has reached a loaded condition suited for a transition to the first control due to sudden acceleration during performance of the second control, while transient surge damping control based on an opening degree of a throttle valve is being performed, the transition to the first control is not made.

14 Claims, 8 Drawing Sheets

CONTROL DEVICE AND CONTROL METHOD FOR VEHICLE

INCORPORATION BY REFERENCE

The disclosures of Japanese Patent Application Nos. HEI 10-57985 filed on Mar. 5, 1999 and HEI 10-62092 filed on Mar. 9, 1999 including the specifications, drawings and abstracts are incorporated herein by reference in their entirety.

BACKGROUND OF THE INVENTION

1. Field of the Invention

The present invention relates to a control device and a control method for controlling a base injection amount of fuel in a vehicle in which a direct fuel injection type engine is installed.

2. Description of the Related Art

Many vehicles in which a direct fuel injection type engine is installed have an air flow meter and an intake pipe negative pressure sensor disposed in an intake pipe, with a view to precisely determining an air-fuel ratio of mixture gas. In these vehicles, an amount of intake air, which changes in accordance with the opening and closing of a throttle valve operated through an accelerator pedal, is calculated based on an amount of air flow detected by the air flow meter and a negative pressure detected by the intake pipe negative pressure sensor, and the base injection amount of fuel is controlled based on the calculated amount of intake air of the engine such that an optimal air-fuel ratio is achieved.

For such engines, there has been proposed a control device designed to cause different types of combustion by changing the timing for fuel injection in a combustion cycle. For example, during low-load operation (at the time of a low rotational speed), mixture gas of a high fuel concentration is biased toward a zone in the vicinity of an ignition plug of the engine, and a first control wherein fuel injection is carried out in the latter half of the compression stroke of the engine is performed so as to cause so-called stratified combustion. During high-load operation (at the time of a high rotational speed), mixture gas is evenly distributed in the combustion chamber, and a second control wherein fuel injection is carried out in the intake stroke of the engine is performed so as to cause so-called homogeneous combustion.

By the way, it is known in a vehicle provided with a continuously variable transmission that if the continuously variable transmission has been operated toward a lower speed based on a requirement for sudden acceleration resulting from depression of an accelerator pedal, the vehicle body oscillates longitudinally at the time of termination of the speed-change operation. This oscillation is called bucking or transient surge. That is, if the continuously variable transmission is operated toward a lower speed in response to a requirement for sudden acceleration, the rotational speed of rotating bodies relating to transmission of motive power changes, and an inertia torque corresponding to an amount of change in rotational speed (angular acceleration) and an inertia moment is generated. When the rotational speed of those rotating bodies settles down to a target rotational speed after termination of a speed-change operation, the inertia torque is released. As a result, the driving torque temporarily increases due to the inertia torque, and the vehicle oscillates longitudinally against the oscillating elasticity of a power transmission system.

For example, in order to damp transient surges of this kind, the present applicant has proposed a device disclosed in Japanese Patent Application No. HEI 11-5460. In this device, based on an output torque of the engine and a speed-change ratio, a half cycle of transient surge oscillation, which is expected in terminating a speed-change operation, is calculated. At a predetermined time determined on the basis of a point of time prior to a point of time of generation of the expected transient surge oscillation by a half cycle, both the output torque of the engine and the speed-change ratio of the CVT are controlled. Thereby oscillation of an opposite phase is generated to counterbalance the transient surge oscillation of the vehicle body. In this manner, the transient surge oscillation is damped. Hereinafter, the control for thus damping longitudinal oscillation of the vehicle by controlling at least one of the engine and the continuously variable transmission will be referred to as transient surge damping control. The transient surge damping control is particularly effective in a direct fuel injection type engine with a good operational response performance.

On the other hand, as for oscillation of the vehicle, there is a device designed to perform so-called smoothing control wherein the output torque of the engine is gradually reduced by outputting a decreasing base injection amount step by step so as to attenuate a shock at the time of deceleration such as sudden braking.

However, in the case where the transient surge damping control at the time of sudden acceleration and the smoothing control at the time of deceleration are applied to a vehicular control device designed to selectively perform the first control and the second control as described above, if a transition from the second control to the first control or vice versa is made during performance of the transient damping control or the smoothing control, because of a discrepancy in control amount between the first control and the second control, there occurs a shock caused by abrupt fluctuations of torque. As a result, there arises a problem of an inability to effectively perform the transient surge damping control and the smoothing control.

Because the transient surge damping control is intended to counterbalance transient surge oscillation, control amounts need to be outputted at extremely precise timings. However, since the change in amount of intake air is temporally offset from the change in output torque of the engine, the transient surge damping control based on an amount of intake air of the engine makes it difficult to output control amounts at precise timings.

SUMMARY OF THE INVENTION

It is an object of the present invention to effectively perform transient surge damping control and smoothing control in a control device and a control method for a vehicle designed to selectively perform the first control and the second control.

According to a first aspect of the present invention, there is provided a control device for a vehicle provided with an engine and a continuously variable transmission, comprising first control means for carrying out fuel injection in an intake stroke of the engine so as to evenly distribute mixture gas into a combustion chamber of the engine, second control means for carrying out fuel injection in a compression stroke of the engine so as to bias mixture gas toward a zone close to an ignition plug of the engine, transient surge damping control means for damping longitudinal oscillation of the vehicle by controlling at least one of the engine and the continuously variable transmission, and selection means for selecting either control through the first control means or control through the second control means in accordance with a loaded condition of the engine and for prohibiting a transition from the second control to the first control if the transient surge damping control is being performed when a loaded condition of the engine becomes suited for a transition to the first control during performance of the second control.

In the first aspect of the present invention, during performance of the second control wherein fuel injection is carried out in an intake stroke of the engine so as to evenly distribute mixture gas into the combustion chamber of the engine, even if the engine has reached a loaded condition suited for a transition to the first control wherein fuel injection is carried out in a compression stroke of the engine so as to bias mixture gas toward a zone in the vicinity of the ignition plug, as long as the transient surge damping control is being performed for the engine or the continuously variable transmission, the transition to the first control is not made. The transition to the first control is made on condition that the transient surge damping control has been terminated. In this manner, according to the first aspect of the present invention, the transition from the second control to the first control is made after termination of the transient surge damping control. Therefore, there is no possibility of a shock occurring due to such transition being made during performance of the transient surge damping control. Further, in the case where the transient surge damping control is performed based on an opening degree of the throttle valve, the response performance is improved in comparison with the case where the transient surge damping control is performed based on an amount of intake air. Thus, control amounts can be outputted at extremely precise timings. Accordingly, the first aspect of the present invention makes it possible to effectively perform the transient surge damping control.

According to a second aspect of the present invention, there is provided a control device for a vehicle provided with an engine and a continuously variable transmission, comprising first control means for carrying out fuel injection in an intake stroke of the engine so as to evenly distribute mixture gas into a combustion chamber of the engine, second control means for carrying out fuel injection in a compression stroke of the engine so as to bias mixture gas toward a zone close to an ignition plug of the engine, smoothing control means for gradually reducing an output torque of the engine during deceleration of the vehicle, and selection means for selecting either control through the first control means or control through the second control means in accordance with a load condition of the engine and for prohibiting a transition from the first control to the second control if the smoothing control is being performed when a loaded condition of the engine becomes suited for a transition to the second control during performance of the first control.

In the second aspect of the present invention, during performance of the first control wherein fuel injection is carried out in a compression stroke of the engine so as to bias mixture gas toward a zone in the vicinity of the ignition plug, even if the engine has reached a load condition suited for a transition to the second control wherein fuel injection is carried out in an intake stroke of the engine so as to evenly distribute mixture gas into the combustion chamber of the engine, as long as the smoothing control for gradually reducing the output torque of the engine at the time of deceleration of the vehicle is being performed, the transition to the second control is not made. The transition to the second control is made on condition that the smoothing control has been terminated. In this manner, according to the second aspect of the present invention, the transition from the first control to the second control is made after termination of the smoothing control. Therefore, there is no possibility of a shock occurring due to such transition being made during performance of the smoothing control. Thus, the smoothing control can be performed effectively.

According to a third aspect of the present invention, there is provided a control device for a vehicle provided with an engine and a continuously variable transmission, comprising first control means for carrying out fuel injection in an intake stroke of the engine so as to evenly distribute mixture gas into a combustion chamber of the engine, second control means for carrying out fuel injection in a compression stroke of the engine so as to bias mixture gas toward a zone close to an ignition plug of the engine, selection means for switching the first control and the second control from one to the other in accordance with a loaded condition of the engine and performing the selected control, third control means for performing, for a predetermined length of time, control wherein fuel injection is carried out in both a compression stroke and an intake stroke of the engine, when the selection means switches the first control and the second control from one to the other, transient surge damping control means for damping longitudinal oscillation of the vehicle by controlling at least one of the engine and the continuously variable transmission, and prohibition means for prohibiting performance of the third control when the transient surge damping control is being performed.

In the third aspect of the present invention, in a normal running state where the transient surge damping control is not being performed, when switching the first control wherein fuel injection is carried out in a compression stroke of the engine so as to bias mixture gas toward a zone in the vicinity of the ignition plug and the second control wherein fuel injection is carried out in an intake stroke of the engine so as to evenly distribute mixture gas into the combustion chamber of the engine, from one to the other, the third control wherein fuel injection is carried out in both a compression stroke and an intake stroke of the engine is performed for a predetermined length of time. While the transient surge damping control for damping longitudinal oscillation of the vehicle by controlling the engine or the continuously variable transmission is being performed, the second control is not performed. Therefore, according to the third aspect of the present invention, even if the fuel injection amount for controlling the output torque of the engine has increased from a zone suited for stratified combustion to a zone suited for homogeneous combustion while the transient surge damping control is being performed, the concentration of fuel in the vicinity of the ignition plug does not become excessively high or excessively low. Thus, the transient surge damping control can be performed effectively.

BRIEF DESCRIPTION OF THE DRAWINGS

The foregoing and further objects, features and advantages of the present invention will become apparent from the following description of preferred embodiments with reference to the accompanying drawings, wherein.

DETAILED DESCRIPTION OF PREFERRED EMBODIMENTS

Figure 1:
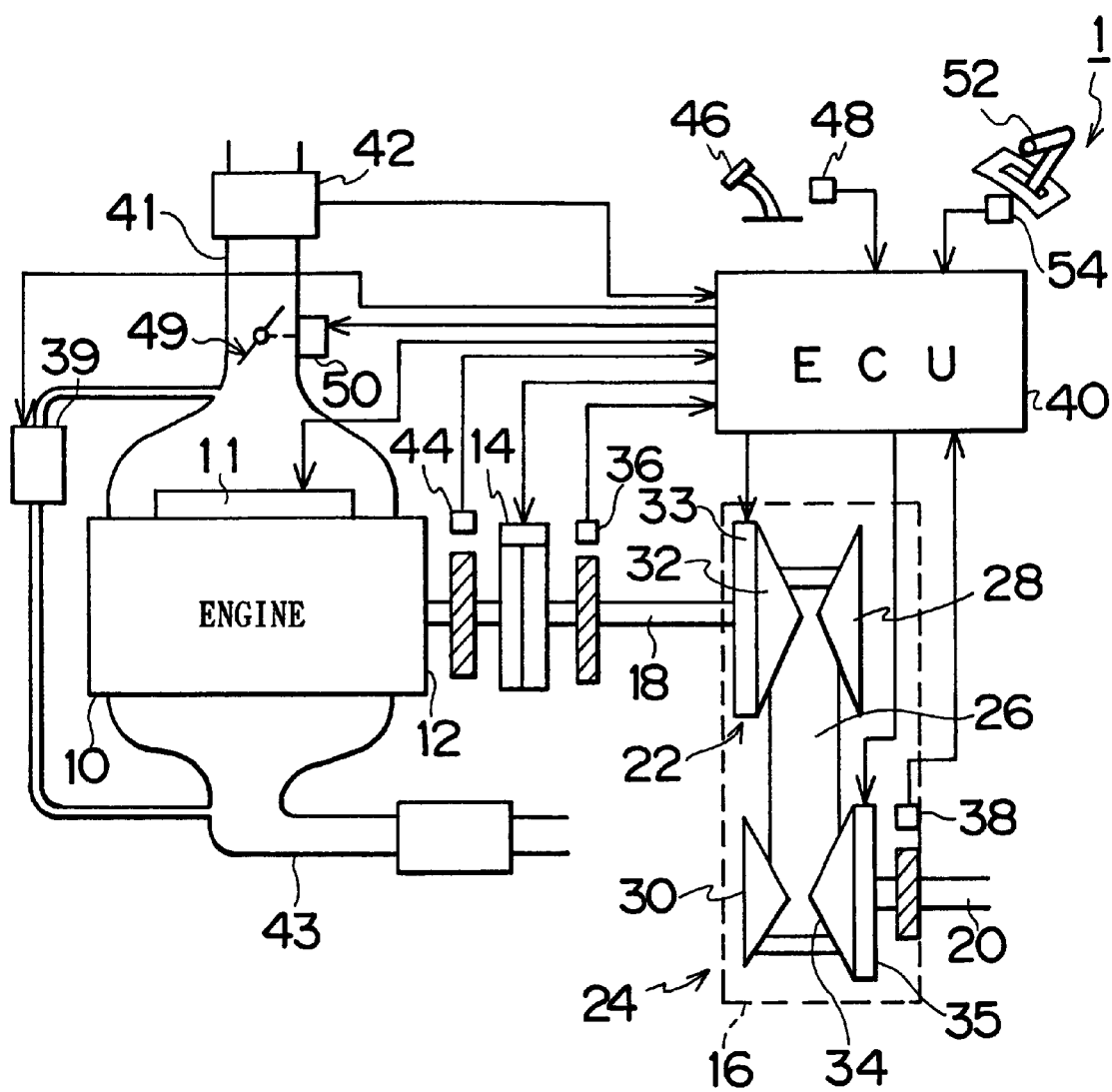
FIG. 1 is a block diagram schematically showing the structure of a vehicular control device according to embodiments of the present invention.

Preferred modes of implementation (hereinafter referred to as embodiments) of the present invention will be described hereinafter with reference to the drawings. FIG. 1 schematically shows the structure of a vehicular control device according to the embodiments of the present invention. A vehicle associated with these embodiments has a direct injection type engine 10 connected to a running section (not shown) equipped with drive wheels through a continuously variable transmission 16.

Referring to FIG. 1, a crankshaft 12 of the engine 10 is coupled to an input shaft 18 of the belt-type continuously variable transmission (hereinafter referred to as the CVT) through a starting clutch 14. An output shaft 20 of the CVT 16 is coupled to a drive shaft of the vehicle through a differential gear device (not shown) and the like, whereby a turning force of the engine 10 is transmitted to the drive wheels of the running section.

The input shaft 18 and the output shaft 20 of the CVT 16 are provided with variable pulleys 22 and 24 respectively, whose effective diameters are variable. A drive belt is hung on the variable pulleys 22 and 24. The variable pulleys 22 and 24 are provided with stationary rotating bodies 28 and 30 and with movable rotating bodies 32 and 34 respectively. The stationary rotating bodies 28 and 30 are fixed to the input shaft 18 and the output shaft 20 respectively. The movable rotating bodies 32 and 34 are disposed on the input shaft 18 and the output shaft 20 respectively such that the movable rotating bodies 32 and 34 can move axially but cannot rotate relative to each other. Hydraulic actuators 33 and 35, which are attached to the movable rotating bodies 32 and 34 respectively, operate to axially displace the movable rotating bodies 32 and 34. Thereby, V-grooves formed between the stationary rotating bodies 28 and 30 and the movable rotating bodies 32 and 34 respectively change in width, and the hanging diameter of the drive belt 26 is changed.

The input shaft 18 and the output shaft 20 of the CVT 16 are provided with rotational speed sensors 36 and 38, which are designed to detect rotational speeds of the input shaft 18 and the output shaft 20 respectively. The rotational speed sensors 36 and 38 are electrically connected to an electronic control unit (hereinafter referred to as the ECU) 40, which is mainly composed of a microcomputer. The ECU 40 controls a speed-change ratio of the CVT 16 based on detection signals of the rotational speed sensors 36 and 38.

The engine 10 is provided with a fuel injection device 11 for directly injecting fuel into combustion chambers. A throttle valve 49, which is installed in an intake pipe 41 of the engine 10, is provided with a throttle actuator 50 for opening and closing the throttle valve 49. An intake pipe negative pressure sensor 42 for detecting an intake pipe negative pressure to calculate an amount of intake air is provided in the intake pipe 41. On the other hand, a rotational speed sensor 44 for detecting a rotational speed of the engine is provided in the vicinity of the crankshaft 12. The intake pipe 41 and an exhaust pipe 43 are made to communicate with each other in an open-close manner by an EGR device 39 and an EGR passage. The fuel injection device 11, the throttle actuator 50, the intake pipe negative pressure sensor 42, the rotational speed sensor 44 and the EGR device 39 are electrically connected to the ECU 40, which is designed to control a base injection amount of the fuel injection device 11 and an operation amount of the EGR device 39 according to various detection values.

On the other hand, an accelerator sensor 48 for detecting an opening degree of the throttle valve 49 is provided in the vicinity of an accelerator pedal 46, with which the throttle valve 49 is interlocked. Based on an opening degree of the throttle valve obtained from a detection value of the accelerator sensor 48, a vehicle speed detected by the rotational speed sensor 38 and an engine rotational speed detected by the rotational speed sensor 44, the ECU 40 controls an amount of intake air through the throttle actuator 50.

A shift lever 52, which is provided in the vicinity of a driver's seat, is provided with a shift sensor 54 for detecting an operational position of the shift lever 52. Based on information on a drive range and the like detected by the shift sensor 54 and information on vehicle speed, accelerator opening degree and the like, the ECU 40 controls the starting clutch 14 and a speed-change ratio of the CVT 16.

Figure 3:
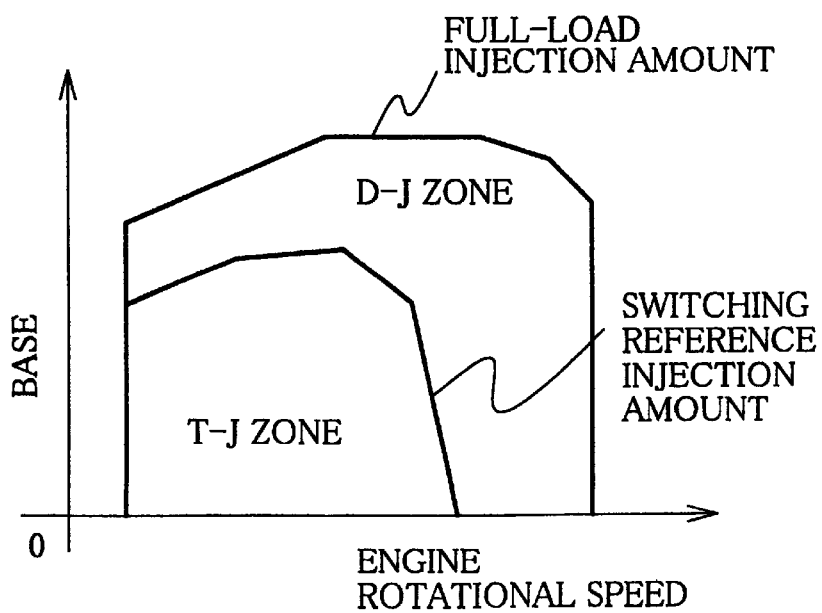
FIG. 3 is a graph showing a switching reference injection amount in the first embodiment.

An example of control performed in the vehicular control device 1 having such a construction will be described hereinafter. In the first embodiment of the present invention, pressure reference injection control (D-Jetronic®; hereinafter referred to as D-J load control) and throttle reference injection control (T-Jetronic®; hereinafter referred to as T-J load control) are performed as first control and second control respectively. In the first control, the base injection amount is controlled based on an amount of intake air of the engine 10 calculated from a detection value of the intake pipe negative pressure sensor 42. In the second control, the base injection amount is controlled based on an opening degree of the throttle valve calculated from a detection value of the accelerator sensor 48. Furthermore, as shown in FIG. 3, the first control and the second control are switched from one to the other in accordance with a base injection amount and a load condition of the engine 10. The D-J load control is selectively performed at the time of a high load (at the time of a high rotational speed and a large injection amount), whereas the T-J load control is selectively performed at the time of a low load (at the time of a low rotational speed and a small injection amount).

A switching reference injection amount, which serves as a criterion for switching the D-J load control and the T-J load control from one to the other, is set with a certain hysteresis, taking both a load-increasing case and a load-decreasing case into account. That is, the switching reference injection amount shown in FIG. 3 only relates to a case where the load increases at the time of a transition from a T-J zone to a D-J zone. Conversely, in a case where the load decreases at the time of a transition from the D-J zone to the T-J zone, a base injection amount smaller than the switching reference injection amount shown in FIG. 3 is used as a switching reference injection amount.

The timing of fuel injection in a combustion cycle of the engine 10 differs depending on whether the D-J load control or the T-J load control is being performed. Thus, the type of combustion occurring during the D-J load control is different from the type of combustion occurring during the T-J load control. That is, so-called homogeneous combustion occurs during the D-J load control through fuel injection in an intake stroke, and so-called stratified combustion wherein mixture gas of a high concentration is formed only in the vicinity of an ignition plug occurs during the T-J load control through fuel injection in the latter half of a compression stroke.

Figure 4:
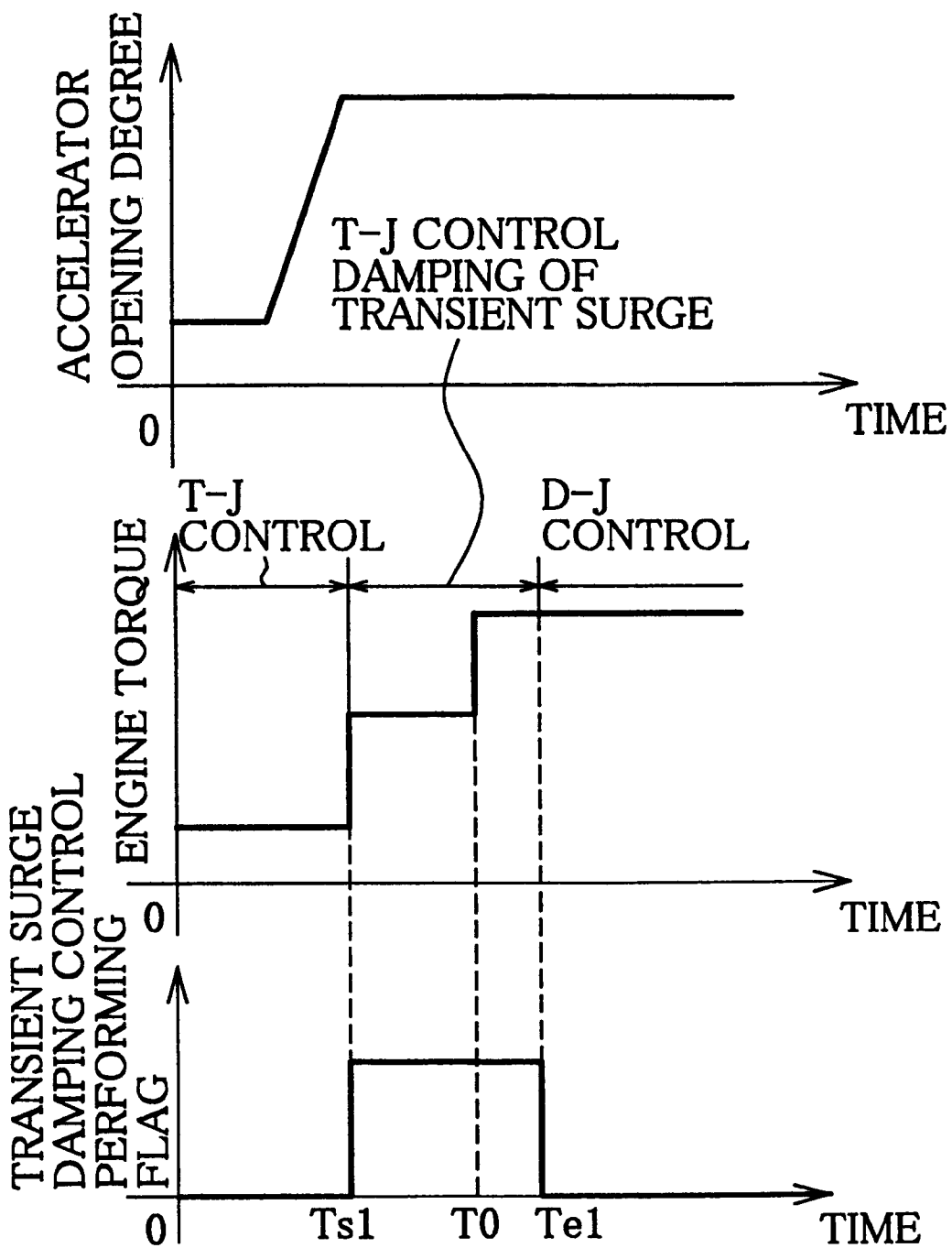
FIG. 4 is a timing chart of control in the first embodiment.

Furthermore, during later-described control operations in the respective embodiments, the aforementioned transient surge damping control is performed at the time of sudden depression of the accelerator pedal 46. That is, an output torque of the engine 10 is calculated based on an opening degree of the throttle valve calculated from a detection value of the accelerator sensor 48, and a speed-change ratio of the CVT 16 is calculated based on respective detection values of the rotational speed sensors 36 and 38. Based on the thus-calculated values, a half cycle of transient surge oscillation, which is expected upon terminating a speed-change operation, is calculated. At a predetermined timing determined on the basis of a point of time (Ts1 in FIGS. 4 and 6) prior to a point of time (T0 in FIGS. 4 and 6) of generation of the expected transient surge oscillation by the half cycle, both the output torque of the engine 10 and the speed-change ratio of the CVT 16 are controlled. Thereby oscillation of an opposite phase is generated to counterbalance the transient surge oscillation of the vehicle body. In this manner, the control for damping transient surge oscillation is performed (from Ts1 to Te1 in FIGS. 4 and 6). In a control subroutine of the transient surge damping control, a transient surge damping control performing flag for indicating that the transient surge damping control is being performed is set. The transient surge damping control performing flag is referred to in a later-described control routine.

What is characteristic of the first embodiment is that, when the engine rotational speed Ne and the base injection amount Q increase during the T-J load control upon abrupt depression of the accelerator pedal 46 and a loaded condition suited for a transition to the D-J load control arises, if the engine 10 and the CVT 16 are being subjected to the transient surge damping control based on an opening degree of the throttle valve, a transition from the T-J load control to the D-J load control is not made. This will be described hereinafter with reference to the flowchart of FIG. 2.

Figure 2:
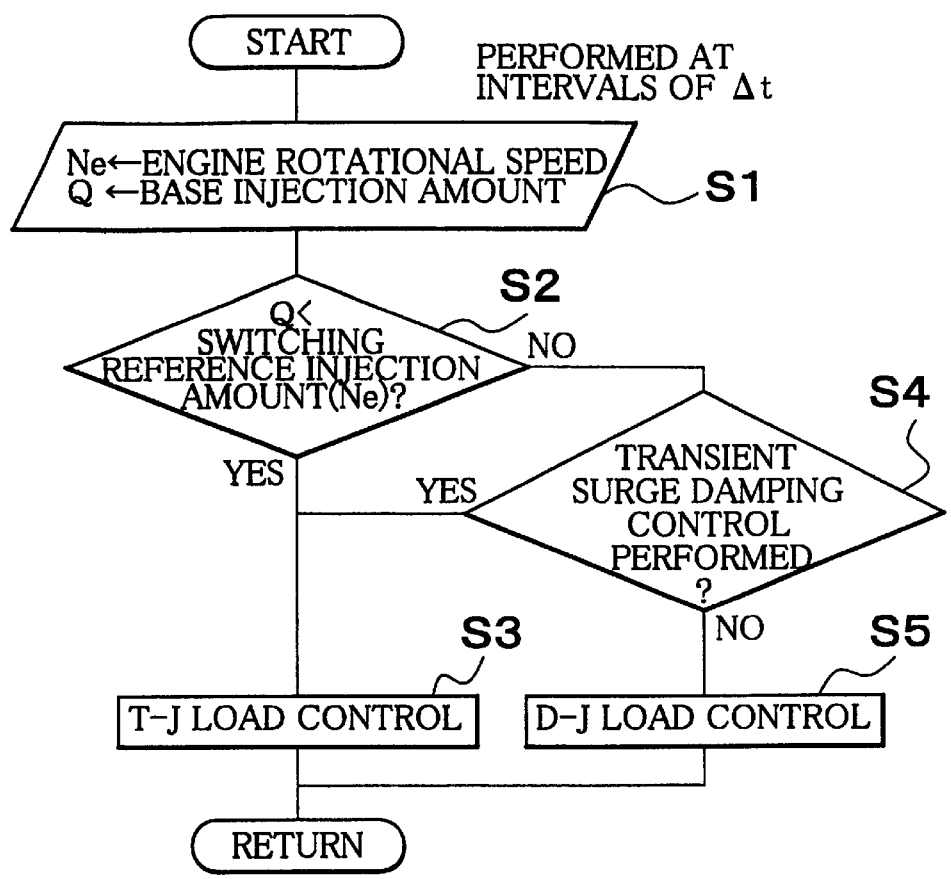
FIG. 2 is a flowchart showing a control process in the first embodiment.

Referring to FIG. 2, first of all, the ECU 40 retrieves an engine rotational speed Ne detected by the rotational speed sensor 44 and a base injection amount Q of the fuel injection device 11 calculated according to the engine rotational speed Ne based on a predetermined map (S1). Then, it is determined in step S2 whether or not the base injection amount Q corresponding to the current engine rotational speed Ne is smaller than the switching reference injection amount shown in FIG. 3.

If the result is affirmative in step S2, namely, if the base injection amount Q is smaller than the switching reference injection amount during low-load operation wherein the engine rotational speed Ne and the base injection amount Q are relatively small, the control proceeds to step S3 where the T-J load control as the second control is performed. That is, in step S3, the base injection amount Q of the fuel injection device 11 is controlled based on an opening degree of the throttle valve calculated from a detection value of the accelerator sensor 48.

If the result in step S2 is negative, namely, if the base injection amount Q is greater than the switching reference injection amount during high-load operation wherein the engine rotational speed Ne and the base injection amount Q are relatively large, the control proceeds to step S4. It is determined in step S4 whether or not the transient surge damping control is being performed, based on whether or not the aforementioned transient surge damping control performing flag has been set. During normal high-load operation wherein the transient surge damping control is not being performed, the result in step S4 is negative and the control proceeds to step S5 where the D-J load control as the first control is performed. That is, in step S5, the base injection amount Q of the fuel injection device 11 is controlled based on an amount of intake air calculated from a detection value of the intake pipe negative pressure sensor 42.

Herein, if the accelerator pedal 46 is depressed abruptly during the T-J load control, the aforementioned transient surge damping control is performed for the engine 10 and the CVT 16, and the aforementioned transient surge damping control performing flag is set. On the other hand, if the engine rotational speed Ne and the base injection amount Q increase in response to abrupt depression of the accelerator pedal 46 and the base injection amount Q has become greater than the switching reference injection amount shown in FIG. 3, namely, if a loaded condition suited for a transition to the D-J load control has arisen, it is determined in step S4 whether or not the transient surge damping control is being performed based on whether or not the aforementioned transient surge damping control performing flag has been set. However, since the transient surge damping control is herein being performed, the result in step S4 is affirmative. Then the control proceeds again to step S3 where the T-J load control as the second control is continued.

The result in step S4 becomes negative on condition that the transient surge damping control has been terminated. Then the control proceeds to step S5 where the D-J load control as the first control is performed. That is, in step S5, the base injection amount Q of the fuel injection device 11 is controlled based on an amount of intake air calculated from a detection value of the intake pipe negative pressure sensor 42.

In this manner, according to the first embodiment, if the loaded condition of the engine becomes suited for a transition to the D-J load control as the first control based on an amount of intake air while the T-J load control as the second control based on an opening degree of the throttle valve is being performed, and if the transient surge damping control based on an opening degree of the throttle valve is being performed for the engine 10 and the CVT 16, a transition from the T-J load control to the D-J load control is made on condition that the transient surge damping control has been terminated. Accordingly, in the first embodiment, while the transient surge damping control is being performed, a transition from the T-J load control to the D-J load control is not made. The transition to the D-J load control is made after termination of the transient surge damping control. Therefore, there is no possibility of a shock being caused due to such transition during the transient surge damping control. Also, since the transient surge damping control is performed based on an opening degree of the throttle valve, there is no delay of change in amount of intake air, and control values can be outputted at highly precise timings. Thus, the transient surge damping control can be performed effectively.

A second embodiment of the control performed in the vehicular control device 1 will be described hereinafter. In the second embodiment, if the accelerator pedal 46 has been released, the aforementioned smoothing control is performed based on an amount of intake air calculated from a detection value of the intake pipe negative pressure sensor 42. That is, the decreasing base injection amount Q is outputted to the fuel injection device 11 step by step in response to the release of the accelerator pedal 46 so as to attenuate a shock at the time of deceleration such as abrupt braking. Thereby the output torque of the engine 10 is gradually reduced. In a control subroutine of this smoothing control, as shown in a timing chart of FIG. 6, a smoothing control performing flag indicating that the smoothing control is being performed is set. This smoothing control performing flag is referred to in the control routine of the second embodiment as will be described later.

Further, in the second embodiment, as in the first embodiment, the T-J load control and the D-J load control are performed during low-load operation and high-load operation, respectively, in accordance with a loaded condition of the engine 10. If a loaded condition suited for a transition to the D-J load control arises in response to abrupt acceleration during the T-J load control, and if the transient surge damping control is being performed, a transition from the T-J load control to the D-J load control is made on condition that the transient surge damping control has been terminated. This is also the same as in the aforementioned first embodiment.

Figure 5:
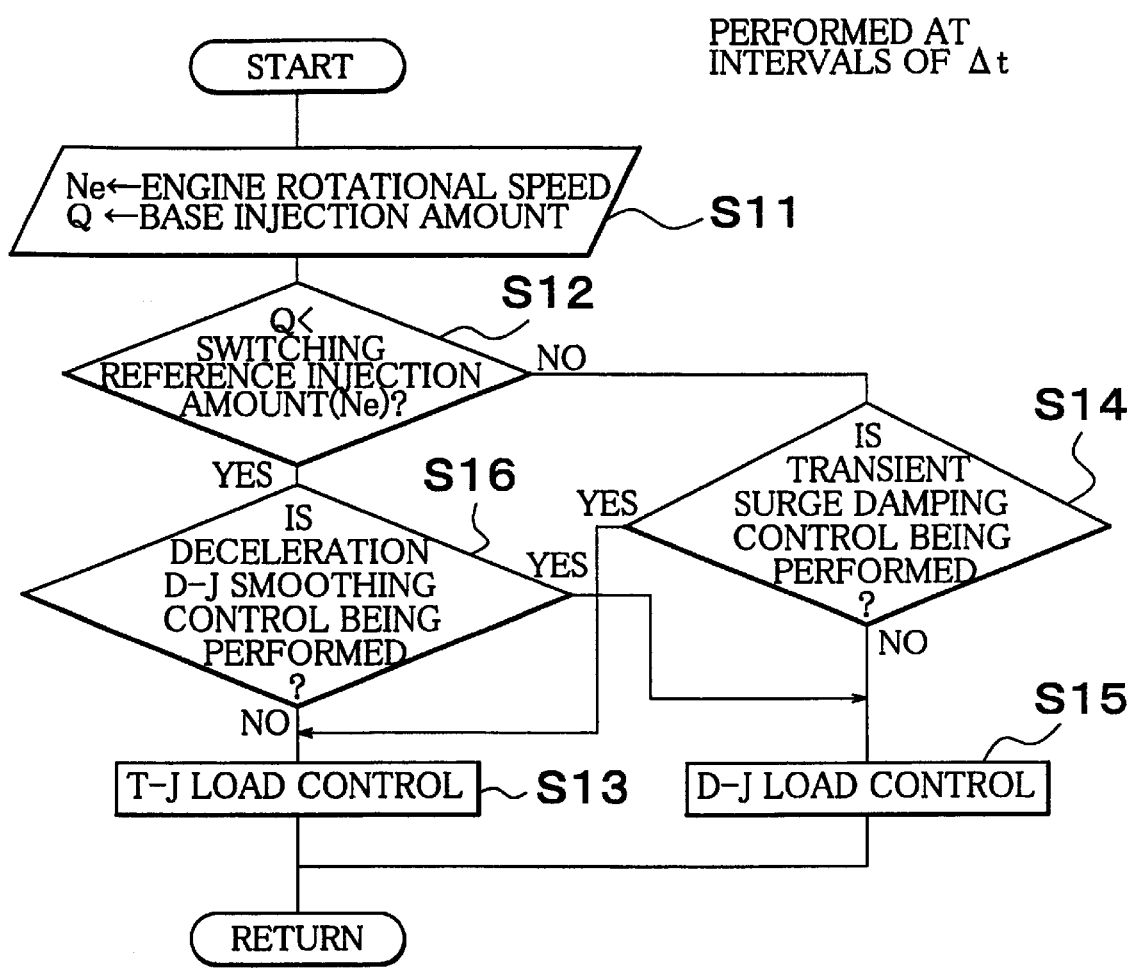
FIG. 5 is a flowchart showing a control process in the second embodiment.
Figure 6:
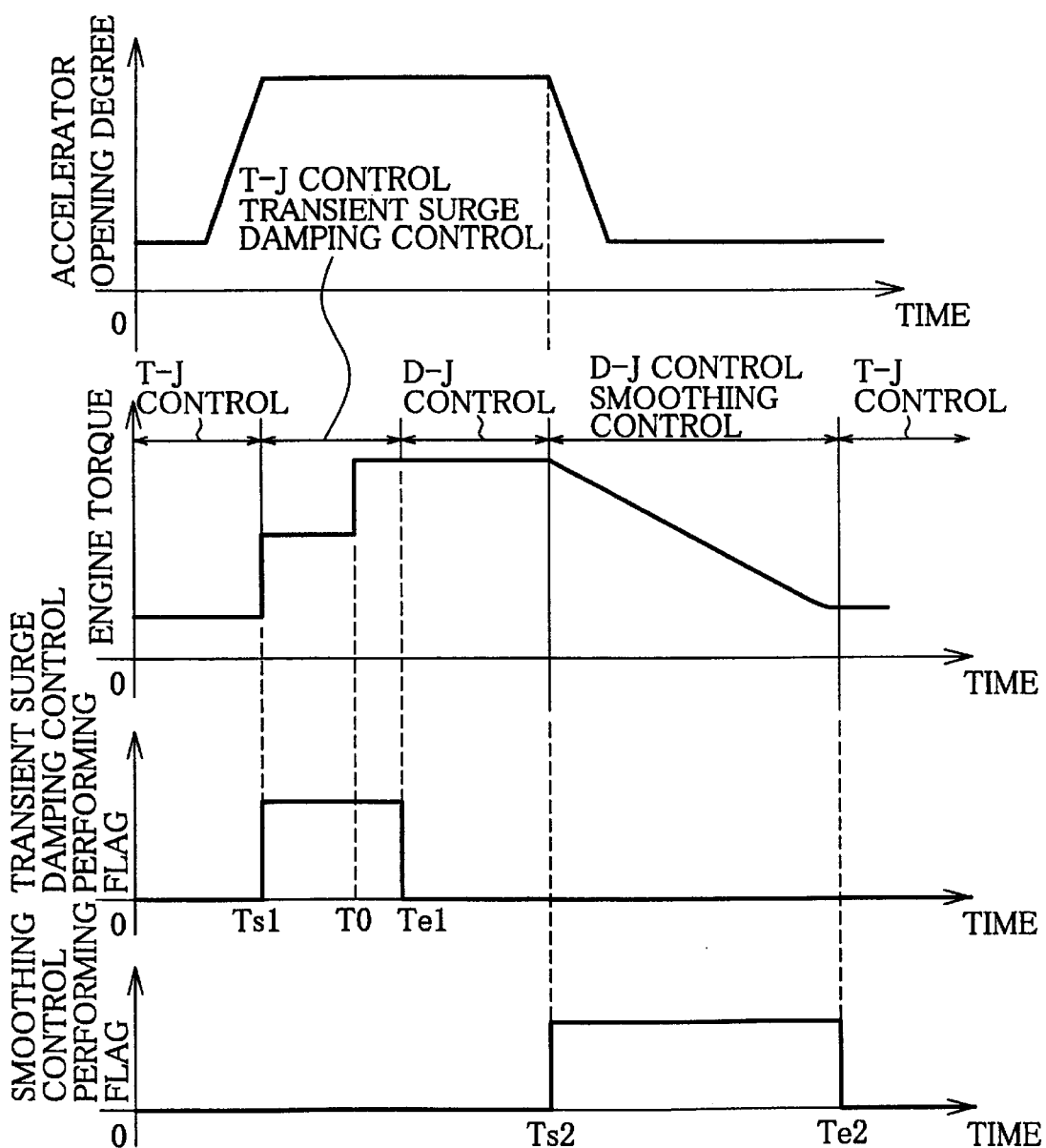
FIG. 6 is a timing chart of control in the second embodiment.

Thus, what is characteristic of the second embodiment is that when the engine rotational speed Ne and the base injection amount Q decrease in response to the release of the accelerator pedal 46 during the D-J load control at a point of time Ts2 in the timing chart of FIG. 6 and a loaded condition suited for a transition to the T-J load control arises, if the smoothing control wherein the output torque of the engine is gradually reduced at the time of deceleration of the vehicle is being performed, a transition to the T-J load control is not made until the smoothing control is terminated, and a transition from the D-J load control to the T-J load control is made on condition that the smoothing control is terminated at a point of time Te2 in FIG. 6. This will be described hereinafter with reference to a flowchart of FIG. 5.

Referring to respective control steps in FIG. 5, the control operations in steps S11 through S15 are the same as those in steps S1 through S5. That is, it is determined whether or not the base injection amount Q retrieved in step S11 is smaller than the switching reference injection amount shown in FIG. 3 (S12). If the result is affirmative in step S12, namely, it is a time of low-load operation, the T-J load control is performed (S13). If the result is negative in step S12, namely, it is a time of high-load operation, the D-J load control is performed (S15). Further, even when the engine rotational speed Ne and the base injection amount Q increase in response to abrupt acceleration during the T-J load control and a loaded condition suited for a transition to the D-J load control arises, if the transient surge damping control is being performed, the T-J load control is continued without making a transition to the D-J load control (S13). The transition to the D-J load control is made on condition that the transient surge damping control has been terminated.

Then, if the accelerator pedal 46 is released during the D-J load control, the smoothing control based on the aforementioned amount of intake air is performed for the engine 10, and the aforementioned smoothing control performing flag is set. On the other hand, if the engine rotational speed Ne and the base injection amount Q decrease in response to the release of the accelerator pedal 46, and if the base injection amount Q has become smaller than a predetermined switching reference injection amount and a loaded condition suited for a transition to the T-J load control has arisen, the result in step S12 becomes affirmative. The control then proceeds to step S16 where it is determined whether or not the smoothing control is being performed, based on whether or not the aforementioned smoothing control performing flag has been set. However, since the smoothing control is herein being performed, the result in step S16 becomes affirmative. Then the control again proceeds to step S15 here the D-J load control as the first control is continued.

Then, if the result in step S16 becomes negative on condition that the smoothing control has been terminated, the control then proceeds to step S13 where the T-J load control as the second control is performed. That is, in step S13, the base injection amount Q of the fuel injection device 11 is controlled based on an opening degree of the throttle valve calculated from a detection value of the accelerator sensor 48.

Thus, according to the second embodiment, if the loaded condition of the engine has become suited for a transition to the T-J load control as the second control based on an opening degree of the throttle valve during the D-J load control as the first control based on an amount of intake air, and if the smoothing control based on the amount of intake air is being performed for the engine 10, a transition from the D-J load control to the T-J load control is made on condition that the smoothing control has been terminated. Accordingly, in the second embodiment, while the smoothing control is being performed, a transition from the D-J load control to the T-J load control is not made. The transition to the T-J load control is made after termination of the smoothing control. Therefore, there is no possibility of a shock being caused due to such transition during the smoothing control. Also, the smoothing control is performed, as it were, through a decelerating operation, and even if the smoothing control is performed based on an amount of intake air, there is no hitch resulting from a delay of change in amount of intake air. Thus, the smoothing control can be performed effectively.

According to a decreasing pattern of engine torque through the smoothing control as shown in the timing chart of FIG. 6 of the second embodiment, the engine torque decreases linearly from the point of time Ts2 to the point of time Te2. The smoothing control of the present invention is not limited to such a control pattern, and any control pattern can be employed as long as it gradually reduces the output torque of the engine. For example, a control pattern for reducing the output torque stepwise or a control pattern for reducing the output torque abruptly at first and gently in the end may also be employed.

Further, in the aforementioned respective embodiments, when performing the D-J load control as the first control based on an amount of intake air of the engine, the amount of intake air is calculated using a detection value of the intake pipe negative pressure sensor 42. However, in order to detect an amount of intake air, the present invention may be designed to employ other components such as a vane-type air flow valve. Also, in the aforementioned respective embodiments, when performing the T-J load control as the second control based on an opening degree of the throttle valve, the opening degree of the throttle valve 49 is calculated using a detection value of the accelerator sensor 48. However, in order to detect an opening degree of the throttle valve, the present invention may be designed to employ other components such as a potentiometer attached to the throttle valve 49. These constructions also belong to the scope of the present invention.

A third embodiment of the control performed in the vehicular control apparatus 1 will be described hereinafter.

In the control according to the third embodiment, the timing for fuel injection during a combustion cycle is changed so as to cause combustion in different modes. That is, during low-load operation (at the time of a low rotational speed), mixture gas of a high concentration is biased toward a zone in the vicinity of the ignition plug of the engine 10, and in order to cause so-called stratified combustion, the first control wherein fuel injection is carried out in the latter half of a compression stroke of the engine 10 is performed (hereinafter referred to as the "stratified combustion control"). During high-load operation (at the time of a high rotational speed), mixture gas is evenly distributed in the combustion chambers of the engine 10, and in order to cause so-called homogeneous combustion, the second control wherein fuel injection is carried out in an intake stroke of the engine 10 is performed (hereinafter referred to as the "homogeneous combustion control"). The stratified combustion control and the homogeneous combustion control are switched from one to the other in accordance with a base injection amount as a loaded condition of the engine 10. As shown in FIG. 8, the homogenous combustion control is selected during high-load operation (at the time of a high rotational speed and a large injection amount), whereas the stratified combustion control is selected during low-load operation (at the time of a low rotational speed and a small injection amount). In the third embodiment, for the purpose of smoothly switching the stratified combustion control and the homogeneous combustion control from one to the other, fuel injection is carried out at the time of a switching operation as the third control of the present invention, both in the latter half of a compression stroke and in an intake stroke (such control will be referred to hereinafter as the "weakly stratified combustion control"). This weakly stratified combustion control is performed only for a predetermined length of time. To be more specific, the weakly stratified combustion control is performed only while counter values of weak stratification counters 1 and 2, which are set in steps S26 and S33 in the flowchart of FIG. 7, undergo subtraction of 1 from an initial value (e.g. 8) every cycle (at intervals of Δt seconds, e.g. at intervals of 5 milliseconds) and reach zero.

A switching reference injection amount, which serves as a criterion for switching the homogeneous combustion control, the stratified combustion control and the weakly stratified combustion control from one to the other, is set with a certain hysteresis, taking both a load-increasing case and a load-decreasing case into account. That is, the switching reference injection amount shown in FIG. 8 only relates to a case where the load increases at the time of a transition from a stratified combustion zone to a homogeneous combustion zone. Conversely, in a case where the load decreases at the time of a transition from the homogeneous combustion zone to the stratified combustion zone, a base injection amount smaller than the switching reference injection amount shown in FIG. 8 is used as a switching reference injection amount.

Furthermore, during the control of the third embodiment, the aforementioned transient surge damping control is performed at the time of sudden depression of the accelerator pedal 46. That is, an output torque of the engine 10 is calculated based on an opening degree of the throttle valve calculated from a detection value of the accelerator sensor 48, and a speed-change ratio of the CVT 16 is calculated based on respective detection values of the rotational speed sensors 36 and 38. Based on the thus-calculated values, a half cycle of transient surge oscillation, which is expected upon terminating a speed-change operation, is calculated. At a predetermined timing determined on the basis of a point of time (Ts1 in FIG. 9) prior to a point of time (T01 in FIG. 9) of generation of the expected transient surge oscillation by the half cycle, both the output torque of the engine 10 and the speed-change ratio of the CVT 16 are controlled in a stepwise increasing manner. Thereby oscillation of an opposite phase is generated to counterbalance the transient surge oscillation of the vehicle body. In this manner, the control for damping transient surge oscillation is performed.

Further, at the time of sudden deceleration, the reverse transient surge damping control is performed. That is, at a predetermined timing determined on the basis of a point of time (Ts2 in FIG. 9) prior to a point of time (T02 in FIG. 9) of generation of the expected transient surge oscillation by the half cycle, both the output torque of the engine 10 and the speed-change ratio of the CVT 16 are controlled in a stepwise decreasing manner. Thereby oscillation of an opposite phase is generated to counterbalance the transient surge oscillation of the vehicle body. In this manner, the control for damping transient surge oscillation is performed.

Figure 9:
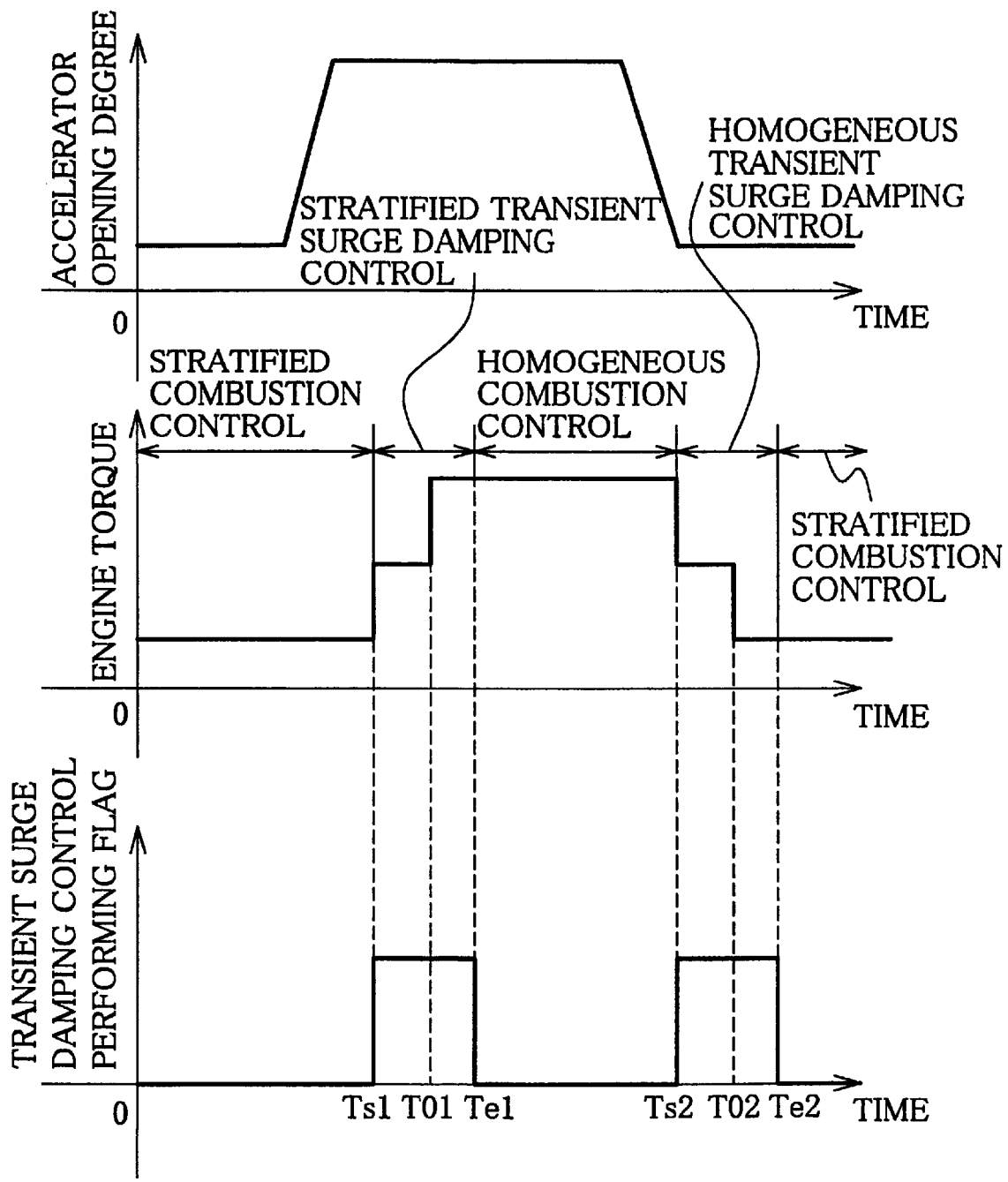
FIG. 9 is a timing chart of control in the third embodiment.

In a control subroutine of such transient surge damping control, a transient surge damping control performing flag for indicating that the transient surge damping control is being performed is set (see FIG. 9). The transient surge damping control performing flag is referred to in a later-described control routine.

Figure 7:
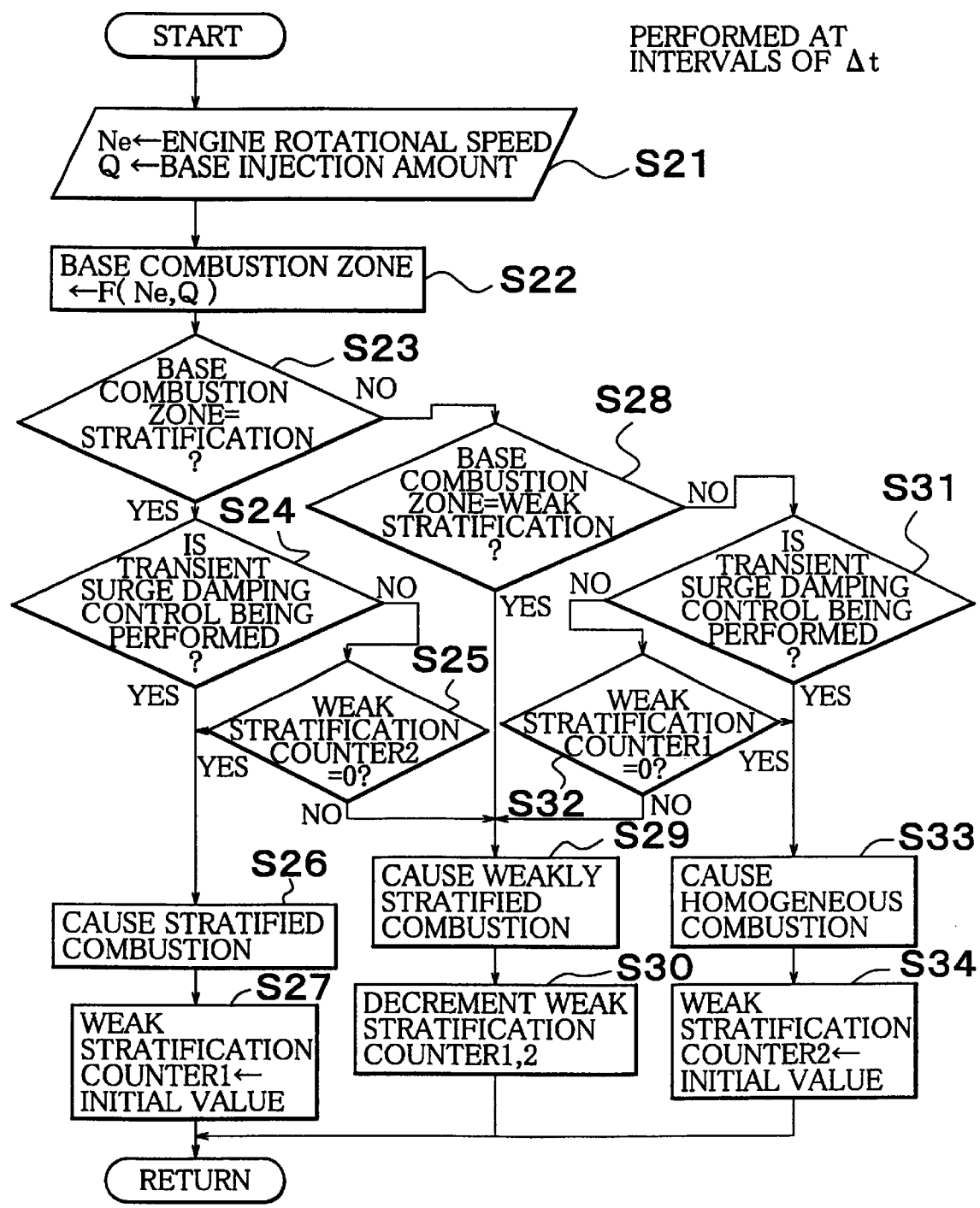
FIG. 7 is a flowchart showing a control process in the third embodiment.
Figure 8:
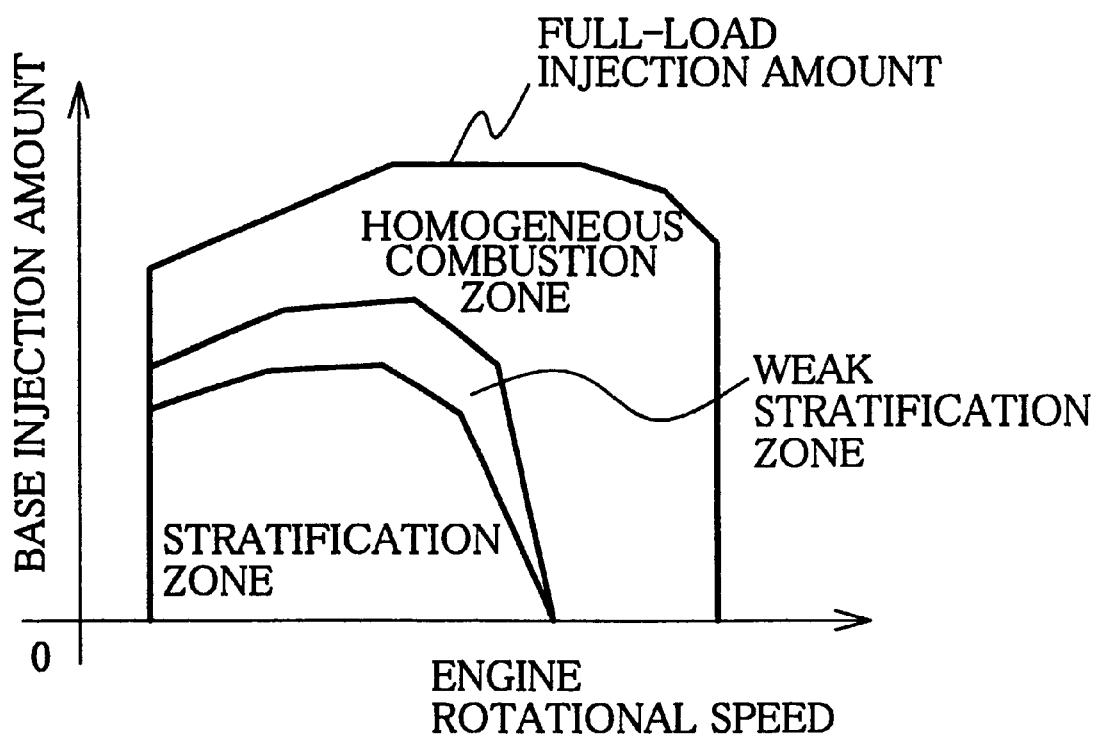
FIG. 8 is a graph showing a switching reference injection amount in the third embodiment.

Referring to FIG. 7, first of all, the ECU 40 retrieves an engine rotational speed Ne detected by the rotational speed sensor 44 and a base injection amount Q of the fuel injection device 11 calculated according to the engine rotational speed Ne based on a predetermined map (S21). Then in step S22, a predetermined calculation F is performed based on the engine rotational speed Ne and base injection amount Q thus retrieved. Thereby, in a map indicative of a base combustion zone corresponding to FIG. 8, it is determined to which one of the homogeneous combustion zone, the stratification zone and the weak stratification zone the current base combustion zone belongs.

Then, it is determined in step S23 whether or not the base combustion zone determined in step S22 is the stratified combustion zone. If the engine rotational speed Ne and the base injection amount Q are relatively small and the base combustion zone belongs to the stratification zone, the result in step S23 is affirmative. Then, it is determined in step S24 whether or not the transient surge damping control is being performed, by referring to the aforementioned transient surge damping control performing flag. During normal operation wherein the transient surge damping control is not being performed, the result in step S23 becomes negative. Then, it is determined in step S25 whether or not the weak stratification counter 2 is at 0. If the result in step S25 is affirmative, the operation proceeds to step S26 where the stratified combustion control as the first control of the present invention is performed. Finally in step S27, the weak stratification counter 1 is set to an initial value (e.g. 8).

Then, if the base combustion zone determined in the aforementioned step S22 is the weak stratification zone, the result in step S23 is negative and the result in step S28 is affirmative. The operation then proceeds to step S29 where the weakly stratified combustion control as the third control of the present invention is performed. Finally in step S30, one is subtracted from counting values of the weak stratification counters 1 and 2.

Further, if the base combustion zone determined in the aforementioned step S22 is the homogeneous zone, the results in step S23 and S28 are negative. Then, it is determined in step S31 whether or not the transient surge damping control is being performed. During normal operation wherein the transient surge damping control is not being performed, the result in step S31 is negative. Then, it is determined in step S32 whether or not the weak stratification counter 1 is at 0. If the result in step S32 is affirmative, the operation proceeds to step S33 where the homogeneous combustion control as the second control of the present invention is performed. Finally in step S34, the weak stratification counter 2 is set to an initial value (e.g. 8).

Further, if the base injection amount Q increases abruptly as a result of sudden acceleration and the base combustion zone has shifted from the stratification zone through the weak stratification zone to the homogeneous zone within an extremely short period during normal operation wherein the transient surge damping control is not being performed, the control tends to proceed from the stratified combustion in step S26 through the weakly stratified combustion (S29) for an extremely short period to the homogeneous combustion (S33). However, in the meantime, until the weak stratification counter 1 assumes 0 in step S32 through a negative determination in step S31, the weakly stratified combustion in step S29 and the subtraction of the counter in step S30 are repeated. Thereby the weakly stratified combustion is forcibly performed for a predetermined length of time. On the contrary, if the base injection amount decreases abruptly as a result of sudden deceleration and the base combustion zone has shifted from the homogeneous combustion zone through the weakly stratified combustion zone to the stratification zone within an extremely short period during normal operation wherein the transient surge damping control is not being performed, the control tends to proceed from the homogeneous combustion (S33) through the weakly stratified combustion (S29) to the stratified combustion (S26). However, in the meantime, until the weak stratification counter 2 assumes 0 in step S25 through a negative determination in step S24, the weakly stratified combustion in step S29 and the subtraction of the counter in step S30 are repeated. Thereby the weakly stratified combustion is forcibly performed for a predetermined length of time. Accordingly, during normal operation wherein the transient surge damping control is not being performed, the stratified combustion and the homogeneous combustion can be switched smoothly from one to the other.

If the base combustion zone belongs to the stratification zone in step S33 and the transient surge damping control is being performed, the stratified combustion is repeatedly caused in step S26. However, if a large base injection amount Q belonging to the homogeneous combustion zone has been calculated in step S21 as a result of performance of the transient surge damping control in this state, the operation proceeds to step S31 through a negative determination in step S28. Then, since the transient surge damping control is still being performed, the result in step S31 becomes affirmative. That is, a direct transition to the homogeneous combustion is made, and the weakly stratified combustion of a predetermined length of time in steps S32 and S29 is not caused.

Conversely, if the base combustion zone belongs to the homogeneous combustion zone and the transient surge damping control is being performed, the homogeneous combustion is repeatedly caused in step S33. However, if a small base injection amount Q belonging to the stratified combustion zone has been calculated in step S21 as a result of performance of the transient surge damping control in this state, the operation proceeds to step S24 through an affirmative determination in step S23. Then, since the transient surge damping control is still being performed, the result in step S23 becomes affirmative. That is, a direct transition to the stratified combustion control is made, and the weakly stratified combustion of a predetermined length of time in steps S25 and S29 is not caused.

Thus, according to the third embodiment, during normal operation wherein the transient surge damping control is not being performed, at the time of a switching operation between the stratified combustion control as the first control wherein fuel injection is carried out in a compression stroke of the engine so as to bias mixture gas toward a zone in the vicinity of the ignition plug of the engine and the homogeneous combustion control as the second control wherein fuel injection is carried out in an intake stroke of the engine so as to evenly distribute mixture gas into the combustion chambers of the engine, the weakly stratified combustion as the third control wherein fuel injection is carried out in both the compression and intake strokes is caused for a predetermined length of time (steps S25, S29 and S32). While the transient surge damping control for damping longitudinal oscillation of the vehicle is being performed by controlling the engine 10 or the CVT 16, the weakly stratified combustion as the third control is not caused (steps S24 and S31). However, since the base injection amount Q of fuel itself increases or decreases drastically within a short period at the time of sudden acceleration or sudden deceleration, combustion occurs appropriately despite the non-performance of the weakly stratified combustion control. Thus, there is no possibility of misfire being caused, and the switching operation between the stratified combustion control and the homogeneous combustion control is performed smoothly.

Thus, according to the third embodiment, even if the fuel injection amount Q for controlling the output torque of the engine 10 has increased stepwise during the transient surge damping control from a zone where the stratified combustion is to occur to a zone where the homogeneous combustion is to occur, the concentration of fuel in the vicinity of the ignition plug does not become excessively high or excessively low. Therefore, the transient surge damping control can be performed effectively.

In the third embodiment, though the transient surge damping control is performed at the time of sudden deceleration, the smoothing control referred in the second embodiment can be performed instead of the transient surge damping control.

While the present invention has been described with reference to what are presently considered to be preferred embodiments thereof, it is to be understood that the present invention is not limited to the disclosed embodiments or constructions. On the contrary, the present invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the present invention.

What is claimed is:

1. A control device for a vehicle provided with an engine and a continuously variable transmission, comprising:

first control means for carrying out fuel injection in an intake stroke of the engine so as to evenly distribute mixture gas into a combustion chamber of the engine;

second control means for carrying out fuel injection in a compression stroke of the engine so as to bias mixture gas toward a zone close to an ignition plug of the engine;

transient surge damping control means for damping longitudinal oscillation of the vehicle by controlling at least one of the engine and the continuously variable transmission; and selection means for selecting one of control through the first control means and control through the second control means in accordance with a loaded condition of the engine, and for prohibiting a transition from the second control to the first control if the transient surge damping control is being performed when a loaded condition of the engine becomes suited for a transition to the first control during performance of the second control.

2. The control device according to claim 1, wherein:

the first control means controls a base injection amount based on an amount of intake air of the engine; and the second control means controls a base injection amount based on an opening degree of a throttle valve of the engine.

3. The control device according to claim 1, further comprising:

third control means for performing, for a predetermined length of time, control wherein fuel injection is carried out in both a compression stroke and an intake stroke of the engine, when the selection means switches the first control and the second control from one to the other.

4. A control device for a vehicle provided with an engine and a continuously variable transmission, comprising:

first control means for carrying out fuel injection in an intake stroke of the engine so as to evenly distribute mixture gas into a combustion chamber of the engine;

second control means for carrying out fuel injection in a compression stroke of the engine so as to bias mixture gas toward a zone close to an ignition plug of the engine;

smoothing control means for gradually reducing an output torque of the engine during deceleration of the vehicle; and selection means for selecting one of control through the first control means and control through the second control means in accordance with a loaded condition of the engine, and for prohibiting a transition from the first control to the second control if the smoothing control is being performed when a loaded condition of the engine becomes suited for a transition to the second control during performance of the first control.

5. The control device according to claim 4, wherein:

the first control means controls a base injection amount based on an amount of intake air of the engine; and the second control means controls a base injection amount based on an opening degree of a throttle valve of the engine.

6. The control device according to claim 4, further comprising:

third control means for performing, for a predetermined length of time, control wherein fuel injection is carried out in both a compression stroke and an intake stroke of the engine, when the selection means switches the first control and the second control from one to the other.

7. A control device for a vehicle provided with an engine and a continuously variable transmission, comprising:

first control means for carrying out fuel injection in an intake stroke of the engine so as to evenly distribute mixture gas into a combustion chamber of the engine;

second control means for carrying out fuel injection in a compression stroke of the engine so as to bias mixture gas toward a zone close to an ignition plug of the engine;

selection means for switching the first control and the second control from one to the other in accordance with a loaded condition of the engine and performing the selected control;

third control means for performing, for a predetermined length of time, control wherein fuel injection is carried out in both a compression stroke and an intake stroke of the engine, when the selection means switches the first control and the second control from one to the other;

transient surge damping control means for damping longitudinal oscillation of the vehicle by controlling at least one of the engine and the continuously variable transmission; and prohibition means for prohibiting performance of the third control when the transient surge damping control is being performed.

8. A control method for a vehicle provided with an engine and a continuously variable transmission, comprising:

a first control step wherein fuel injection is carried out in an intake stroke of the engine so as to evenly distribute mixture gas into a combustion chamber of the engine;

a second control step wherein fuel injection is carried out in a compression stroke of the engine so as to bias mixture gas toward a zone close to an ignition plug of the engine;

a transient surge damping control step wherein longitudinal oscillation of the vehicle is damped by controlling at least one of the engine and the continuously variable transmission; and a selection step of selecting one of the first control step and the second control step in accordance with a loaded condition of the engine, and for prohibiting a transition from the second control step to the first control step if the transient surge damping control step is being performed when a loaded condition of the engine becomes suited for a transition to the first control step during performance of the second control step.

9. The control method according to claim 8, wherein:

the first control step is designed to control a base injection amount based on an amount of intake air of the engine; and the second control step is designed to control a base injection amount based on an opening degree of a throttle valve of the engine.

10. The control method according to claim 8, further comprising:

a third control step wherein fuel injection is carried out for a predetermined length of time in both a compression stroke and an intake stroke of the engine, when the selection means switches the first control step and the second control step from one to the other.

11. A control method for a vehicle provided with an engine and a continuously variable transmission, comprising:

a first control step wherein fuel injection is carried out in an intake stroke of the engine so as to evenly distribute mixture gas into a combustion chamber of the engine;

a second control step wherein fuel injection is carried out in a compression stroke of the engine so as to bias mixture gas toward a zone close to an ignition plug of the engine;

a smoothing control step wherein an output torque of the engine is gradually reduced during deceleration of the vehicle; and a selection step of selecting one of the first control step and the second control step in accordance with a loaded condition of the engine, and for prohibiting a transition from the first control step to the second control step if the smoothing control step is being performed when a loaded condition of the engine becomes suited for a transition to the second control step during performance of the first control step.

12. The control method according to claim 11, wherein:

the first control step is designed to control a base injection amount based on an amount of intake air of the engine; and the second control step is designed to control a base injection amount based on an opening degree of a throttle valve of the engine.

13. The control method according to claim 11, further comprising:

a third control step wherein fuel injection is carried out for a predetermined length of time in both a compression stroke and an intake stroke of the engine, when the selection means switches the first control step and the second control step from one to the other.

14. A control method for a vehicle provided with an engine and a continuously variable transmission, comprising:

a first control step wherein fuel injection is carried out in an intake stroke of the engine so as to evenly distribute mixture gas into a combustion chamber of the engine;

a second control step wherein fuel injection is carried out in a compression stroke of the engine so as to bias mixture gas toward a zone close to an ignition plug of the engine;

a selection step of switching the first control step and the second control step from one to the other in accordance with a loaded condition of the engine and performing the selected control step;

a third control step wherein fuel injection is carried out for a predetermined length of time in both a compression stroke and an intake stroke of the engine, when the selection means switches the first control step and the second control step from one to the other;

a transient surge damping control step wherein longitudinal oscillation of the vehicle is damped by controlling at least one of the engine and the continuously variable transmission; and a prohibition step of prohibiting performance of the third control step when the transient surge damping control step is being performed.

* * * * *